United States Patent
Mower et al.

(10) Patent No.: US 12,415,477 B1
(45) Date of Patent: Sep. 16, 2025

(54) CATALYTIC CONVERTER ANTI-THEFT SYSTEM

(71) Applicant: InterMotive, Inc., Auburn, CA (US)

(72) Inventors: Dan C. Mower, Grass Valley, CA (US); Gregory E. Schafer, Reno, NV (US); Kenneth Nguyen, Elk Grove, CA (US); Bryan M. Elzy, Sparta, TN (US)

(73) Assignee: InterMotive, Inc., Auburn, CA (US)

( * ) Notice: Subject to any disclaimer, the term of this patent is extended or adjusted under 35 U.S.C. 154(b) by 120 days.

(21) Appl. No.: 18/143,894

(22) Filed: May 5, 2023

Related U.S. Application Data (60) Provisional application No. 63/339,234, filed on May 6, 2022.

(51) Int. Cl.
  B60R 25/10 (2013.01)
  F01N 99/00 (2010.01)

(52) U.S. Cl.
  CPC ...... B60R 25/1001 (2013.01); B60R 25/1004 (2013.01); F01N 99/00 (2022.08); B60R 2025/1013 (2013.01); F01N 2260/22 (2013.01)

(58) Field of Classification Search
  CPC ............ B60R 25/1001; B60R 25/1004; B60R 2025/1013; F01N 99/00; F01N 2260/22
  See application file for complete search history.

(56) References Cited

U.S. PATENT DOCUMENTS

| | | | |
|---|---|---|---|
| 5,298,884 A * | 3/1994 | Gilmore | G08B 21/22 340/8.1 |
| 7,420,467 B2 | 9/2008 | Patenaude | |
| 2011/0036130 A1 * | 2/2011 | Hisler | F01N 3/28 70/57.1 |
| 2012/0296567 A1 | 11/2012 | Breed | |
| 2013/0035827 A1 | 2/2013 | Breed | |
| 2014/0266654 A1 | 9/2014 | Parker | |
| 2016/0214726 A1 * | 7/2016 | Giamati | G01R 31/54 |

FOREIGN PATENT DOCUMENTS

WO  WO 2012/164274 A1  12/2012

* cited by examiner

*Primary Examiner* — Brian Wilson
(74) *Attorney, Agent, or Firm* — Heisler & Associates (57) ABSTRACT

An electrically conductive circuit has a distal end coupled to a catalytic converter of a vehicle. A sensor such as a voltage divider is coupled to a proximal end of this conductive circuit. The voltage divider senses when a resistance associated with the conductive circuit is altered, indicative of catalytic converter tampering. An alarm signal can then be sent to the vehicle horn or otherwise beneficially outputted to warn of the tampering. The conductive circuit preferably includes a length of nichrome wire having a substantial resistance. Reliable electrical connection and tampering avoidance can be provided at the distal end of the nichrome wire by utilizing an electrically conductive washer at the distal tip, covering the nichrome wire with high temperature insulating tape, overlying the tape with a pipe clamp and encapsulating the washer, distal end of the nichrome wire, insulating tape and pipe clamp with a high temperature bonding adhesive.

15 Claims, 2 Drawing Sheets

CATALYTIC CONVERTER ANTI-THEFT SYSTEM

CROSS-REFERENCE TO RELATED APPLICATIONS

This application claims benefit under Title 35, United States Code § 119(e) of U.S. Provisional Application No. 63/339,234 filed on May 6, 2022.

FIELD OF THE INVENTION

The following invention relates to the problem of catalytic converter theft and systems and methods for discouraging such theft. More particularly, this invention relates to catalytic converter anti-theft systems and methods which form an electric circuit at least partly grounded through the catalytic converter and which activates an alarm when circuit characteristics are altered, indicative of catalytic converter tampering.

BACKGROUND OF THE INVENTION

All modern gasoline powered automobiles and trucks incorporate catalytic converters as part of their exhaust system to mitigate emissions. Catalytic converters contain expensive metals such as rhodium, platinum, and palladium, which can be sold for recycling. Because of this, catalytic converter theft has become quite common. Thieves can quickly cut through the inlet and exit exhaust pipes using a battery powered portable saw and remove the catalytic converter within a few minutes.

Replacement cost is generally in the $1,000 to $3,000 range, because not only must a replacement catalytic converter be purchased and installed, but the exhaust pipes entering and exiting the catalytic converter must be reconstructed by a muffler shop.

Theft prevention thus far has mostly involved mechanical means, such as welding a cage around the catalytic converter to impede removal. Some electrical methods of tamper detection have been employed, such as IR motion detection, saw vibration detection, each with their own drawbacks.

SUMMARY OF THE INVENTION

The subject of this invention involves the installation of an electrical alarm system, which will honk the vehicle's horn or other sounding device (or other alarm signal output) when tampering is detected. One feature of the invention in an example embodiment is the tampering detection method, which uses a voltage divider circuit, consisting of two resistors (R1 and R2). R1 is integral to the sensing module, and R2 is attached to the catalytic converter. The sensing module senses the voltage between the two series resistors. The voltage at this node between the two resistors is proportional to the resistance of the resistors.

In one illustrated embodiment, the sensing module provides a voltage V1 to one end of R1, which then connects to R2. The junction of R1 and R2 is connected to an Analog to Digital converter on the microcontroller which measures this voltage V2. The ground side of R2 is physically connected to the catalytic converter which is connected to the chassis ground. Under normal operation, V2 is sensed by the microcontroller, and if the expected voltage is sensed, no alarm condition exists, and the audible alarm or horn is not sounded.

If R2 becomes disconnected from the catalytic converter, as will necessarily happen when the catalytic converter is removed from the vehicle, the analog to digital converter (AtoD) input (also called the sensor port) of the microcontroller will sense a voltage change and this will initiate an alarm state, causing an audible alarm, such as honking the vehicles horn, or other audible alarm. Secondary outputs are also provided which can signal a telematics unit to send a wireless alarm to a monitoring station, or other output.

Creating R2

R2 is a required part of the voltage divider. R2 must remain fully functional at the high temperatures and survive the outside environment in which catalytic converters operate, since it will be in contact with the catalytic converter. Catalytic converters can operate in the 1200F to 1600F range, and even higher under certain circumstances. Nichrome wire can be used as one embodiment of R2, which can withstand high temperatures. Nichrome wire has a resistance based on length and diameter of the wire. For this application, a length of nichrome wire can be used to create sufficient resistance to allow sensing of V2. A typical application may use 32 AWG nichrome wire which has a resistance of 10.55 ohms per foot. Using a 6" length of nichrome wire for R2 yields a resistance of approximately 5 ohms.

Adhering R2 to the Catalytic Converter

The bare nichrome wire has a high temperature sheathing insulator applied, such as fiberglass. The end of the wire (which is to be grounded through the catalytic converter) is left unsheathed and is placed in contact with the catalytic converter housing which is grounded to the vehicle chassis ground. A possibly conductive high temperature tape (or other method) holds the nichrome wire in contact with the catalytic converter during installation. A length of coiled (or other rearrange) nichrome wire with insulating sheathing is created in close proximity to the grounded end. The purpose of this coil is to create the necessary length of nichrome wire in order to achieve the desired resistance in one example embodiment. A typical length of this coiled section can be in the six inch range. This coil of wire is pressed down flat onto the catalytic converter, and then covered with a semi-liquid adhesive, such as epoxy. The adhesive then hardens, and makes access to the covered nichrome wire resistor R2 very difficult, thus minimizing the possibility of tampering and defeating the system.

Shorting the nichrome wire anywhere along its exposed region to ground will alter the voltage V2 as it is sensed by the microcontroller's AtoD input, and cause the alarm to be sounded. This presents a "jumper wire" from defeating the system.

It is desirable to provide a length of exposed and sheathed nichrome wire before it is connected to a conventional copper wire with conventional insulation and sheathing. This will keep the conventional copper wire and insulation away from the high temperature of the catalytic converter.

An optional band or clamp (automotive hose clamp type of device) may be placed around the catalytic converter and R2 attach point to help ensure and maintain the R2 ground connection. The desired attachment point on the catalytic converter is near the top or any other protected location, to minimize the possibility of damage from road debris.

Tampering Detection

The detection of tampering is based on a change in the voltage V2 at the microcontroller sensor port, which in turn will be changed by the loss of the ground connection of R2 as the wire connection to the sensing module will have to be cut to remove the catalytic converter.

While one catalytic converter may be removed from one vehicle before the audible alarm starts sounding, the alarm will deter the theft of multiple catalytic converters from a fleet of chassis parked in a group parking yard. Also, the alarm can advance efforts to catch the thief.

For this system and method to be most effective, it is important to prevent a thief from providing an alternate, non-catalytic converter ground connection for R2. If a thief were able to use a jumper wire to provide an alternate ground for R2, the catalytic converter could be removed without the alarm state being triggered. Blocking access to R2 and the substitution of an alternate ground is accomplished by applying a hardening adhesive over R2 which effectively prevents the attachment of an auxiliary ground wire to the end of the nichrome wire. Connecting an auxiliary ground wire elsewhere along the nichrome wire or copper wire would ground R2, but the electric path along the fairly high resistance nichrome wire would be shortened, which would change the resistance value for R2 and the system would detect this resistance change and trigger the alarm.

Minimizing Quiescent Current Draw of the System

The voltage V1 provided to the voltage divider does not have to be present continuously, but rather can be turned on momentarily while the Analog to Digital input is sensed. Turning this V1 voltage on periodically, such as once per second, and only very briefly, such as 200 microseconds or less, will keep the average quiescent current draw very low. Techniques for putting the microcontroller in a low power sleep mode and having it wake up based on an internal timer can be used, thus reducing the average current draw of the system to the level of being inconsequential to the vehicle's battery state of charge.

Telematics Support

Outputs are provided for alerting a Telematics unit based on an alarm condition. The telematics unit could then send a wireless signal to a central monitoring location, notifying of tampering or theft. These outputs can be in the form of a high true or low true discrete wire signal, or could be provided via a wired, serial or wireless communication.

System Calibration

The system can self-calibrate to compensate for variations in resistor R1 and R2 values, variations in the provided V1 voltage from the micro-controller, and variations in the Analog to Digital voltage sensing in the micro-controller. The system can do this upon application of power, commonly referred to as a hard boot operation. This self-calibration will automatically compensate for variations in the R2 value, due to variations in the length of nichrome wire used.

On a hard boot, the system can detect if R2 is properly installed, and if grounded, it will read V2, and store that reading in memory. The periodic sensed voltages will be compared with this stored value, and if the readings are within an acceptable range, the alarm condition will not be triggered.

Alarm Enabled State

It is conceivable that R2 may lose its ground to the catalytic converter while the vehicle is in operation. This might happen if the adhesive fails for whatever reason, and the nichrome wire loses contact with the catalytic converter. R2 could be physically disconnected from the catalytic converter by driving over a foreign object or road debris. The effect of this failure would be an alarm state, potentially with the vehicle honking its horn while driving down the road. Since this is an undesirable condition, it is desirable to only enable the alarm function while the vehicle is not in use. This, in fact, is the only time the catalytic converter is in risk of theft.

Only enabling the alarm state when the vehicle is not in use can be done by sensing the vehicles battery voltage, commonly referred to as "VBAT." When the engine is running on a vehicle, the alternator/generator charging system is generally active, and VBAT will reflect this by being higher than a normal fully charged battery voltage, of approximately 12.6V, typically in the range of 13.5-14.5V. The anti-theft system of this invention can monitor VBAT, and only enable the system when VBAT is below the charging state voltage (typically maintaining this voltage for a period of time to avoid frequent activations if VBAT values vary somewhat). Immediately after shut-down, it may take the battery voltage a few minutes to drop down to 12.6V or lower, depending on the state of charge and battery health.

Audible Alarm

The system provides a discrete wire output, which when an alarm state is entered, alternates between a high (12V) output and a low (0V) output. This output can be connected to the vehicle's horn relay coil, causing the relay to activate, which in turn activates the horn. When in the non-alarmed state, this output is tri-stated and will not activate the relay coil.

When the alarm state is entered the horn will honk in a periodic pulsing manner, similar to the typical car alarm. It will auto shut off after a configurable time out.

Alternatively, the system may be connected to some other form of audible device, and/or may be connected to a warning light on the chassis, or may be wired into the OEM lighting on the chassis, such as the park lamps, or output a wireless signal to other equipment to communicate the alarm state, vehicle location and other pertinent information (e.g. video or still images of the vehicle area) for event reporting purposes.

Post Installation Check Out Diagnostics

When hard booted, the system can be configured to chirp the horn briefly as a confirmation that it is sensing the connection is proper to the catalytic converter and the horn. Note that the system must be connected to "Hot At All Times" in order to function when the vehicle is parked with the key off. Thus, hard boot operations will be rare-generally only during initial installation, and when the vehicle battery is disconnected.

Dual Catalytic Converter Vehicles

Some chassis have two catalytic converters. This invention provides dual connection inputs for such systems. This means there would be dual R1/R2 voltage divider circuits for sensing the presence of both catalytic converters. The outputs to the horn or auxiliary audible sounding device and telematics connection would remain unchanged.

Disabling the System

In the event of a stolen catalytic converter and the resulting alarm state (horn honking) or when working on the exhaust system at a maintenance facility, the system can be disabled by disconnecting power from the sense module. If the sense module's power comes from plugging into the vehicles OBDII connector, it can be simply unplugged to disable the system. As long as the vehicle is locked when parked and not in use, a catalytic converter thief would have to know the system is installed, understand how to disable it, break into the vehicle and de-power the module, then cut out and remove the catalytic converter.

Example System

In one embodiment shown in the figures, a particular arrangement is provided. First, a conductor is provided in direct contact with the catalytic converter. In one embodiment, this can be a washer formed of electrically conductive material, such as a steel washer or a copper washer or an aluminum washer.

Sheathed nichrome wire is electrically attached to this washer or other conductor. Sheathing is removed from the nichrome wire at a tip thereof, just enough so that electrical connection is solidly made between the washer or other conductor and the nichrome wire. The nichrome wire can be any wire which has a readily measurable amount of resistance therein and with an insulating jacket on an exterior thereof, and preferably also high melting point characteristics for the wire and the insulation. The gauge of the nichrome wire would be selected to match the voltage of the system. If the system is a 12 V system, and resistance of the circuit is selected so that a very low current is provided along the wire, an appropriate gauge of wire can thus be selected. Such as 32 AWG, as a typical example. With a free end of the nichrome wire attached to the catalytic converter, either directly or through the washer or other conductor element, a proximal end of this wire is coupled to other parts of the system tied into the control area network (CAN) or other vehicle network, as described in detail above, preferably through a voltage divider arrangement.

Importantly, a length of nichrome wire is concealed and/or made inaccessible adjacent to the catalytic converter and at least somewhat adjacent to the washer or other conductor. In one embodiment, six inches of jacketed nichrome wire is so concealed or made inaccessible. This length of wire is referred to as being "unmolestable." In other words, a thief or other tamperer will either not be able to see this length of wire in order to molest it or will not be able to access this length of wire in order to molest it, or both. In one embodiment, this length of nichrome wire is routed from the washer or other conductor along and beneath a hose clamp which girds the catalytic converter. In one embodiment, three inches of this wire extends from a location adjacent to the washer or other conductor beneath the hose clamp to a location spaced from the washer or other conductor, and then the wire doubles back on itself and returns to the washer or other conductor, where the free end of the wire attaches to the washer or other conductor. About six inches of unmolestable wire are thus provided under the hose clamp which are not readily apparent and which are inaccessible.

The purpose of this length of nichrome wire is that it places a readily measurable amount of electrical resistance between ground at the free end of the wire where it is attached to the washer or other conductor in direct contact with the catalytic converter, and an input voltage, such as provided through electronics associated with a sensing module coupled to the CAN or other vehicle network or other alarm system. The module senses this amount of resistance in the circuit, associated with the length of nichrome wire. If a thief cuts this wire at any location where it is accessible, at least six inches of nichrome wire will be "removed" from the "circuit." This will change the resistance of the circuit. The module is programmed to detect such a change in resistance in the circuit and trigger an alarm, as described in detail above.

If the catalytic converter is removed from the vehicle, eventually this wire will need to be severed. However, as soon as the catalytic converter is cut away from the vehicle, and it is no longer grounded, the circuit going into an "open" state will trigger the alarm, as described in detail above. If a crafty thief attempts to utilize a jumper wire to electrically connect to the nichrome wire to some other ground on the vehicle, this jumper wire would have a different resistance than the nichrome wire, which is sensed by the system as a drop in resistance and triggers the alarm. The wiring is thus highly tamper resistant. Other systems can be added to further impede catalytic converter theft, such as backup power supplies so that disconnecting the battery will still leave power to sound the horn or other alarm. Furthermore, once the battery or other vehicle electronics associated with the system are being accessed, the process of stealing a catalytic converter is made significantly more difficult for the catalytic converter thief.

The length of nichrome wire can be precisely held in position in a variety of different orientations by utilizing high temperature positioning tape to hold the sheathed nichrome wire where desired. In one embodiment, three inches of nichrome wire extends circumferentially in a first direction away from the washer or other conductor and then doubles back to run parallel to itself and back near the washer or other conductor, before extending to the microcontroller. Two or more strips of high temperature positioning tape or a continuous band of such tape hold this doubled back length of nichrome wire along a circumferential path covered by the hose clamp.

The hose clamp, as referenced above, is placed over the nichrome wire and over the washer or other conductor and is clamped down in a manner guarding the electrical connection of the system to the catalytic converter. A high temperature insulator is preferably provided under the hose clamp and over the nichrome wire and over the washer or other conductor. This insulator keeps the hose clamp from shorting out the circuit or wearing on the nichrome wire, which could lead to a "false alarm." A moldable high temperature adhesive is then placed over the high temperature insulator, over the hose clamp and over the washer or other conductor, encapsulating much of the region of the catalytic converter where attachment of the nichrome wire is occurring. One example of such moldable high temperature adhesive would be J-B Weld provided by the J-B Weld Company, LLC of Boulder, Colorado. This moldable high temperature adhesive further helps to hold the attachment to the catalytic converter and also conceals and makes more tamperproof the connection of the free end of the nichrome wire to the washer or other conductor, where it interfaces with the catalytic converter, or the free end of the nichrome wire itself if it is directly attached to the catalytic converter at its free end.

OBJECTS OF THE INVENTION

Accordingly, a primary object of the present invention is to provide a system for sensing when a catalytic converter of a vehicle is being tampered with, and triggering an alarm.

Another object of the present invention is to provide a catalytic converter anti-theft apparatus which reliably detects when a catalytic converter is being tampered with while also being resistant to "false alarms."

Another object of the present invention is to provide a catalytic converter anti-theft apparatus which can be readily integrated into electrical systems of a vehicle, such as an automobile, such as to simplify apparatus installation and performance.

Another object of the present invention is to provide a catalytic converter anti-theft system which detects catalytic converter tampering, either when the catalytic converter is separated from grounding to the vehicle (an open circuit scenario) or when attempts are made to supply an alternate pathway to ground for a electric circuit of the system (a short circuit scenario), to defeat a wide array of catalytic converter theft techniques.

Another object of the present invention is to protect fleets of multiple vehicles from having catalytic converters stolen therefrom by having a first potentially stolen catalytic converter trigger an alarm which prevents further catalytic converter thefts for other vehicles in the fleet.

Another object of the present invention is to provide a method and apparatus for discouraging catalytic converter theft which draws only a very small amount of current, such that the system does not jeopardize health of a starter battery of the system when powered nearby.

Another object of the present invention is to provide a method and apparatus for discouraging catalytic converter theft which can be utilized on vehicles having more than one catalytic converter.

Other further objects of the present invention will become apparent from a careful reading of the included drawing figures, the claims and detailed description of the invention.

DESCRIPTION OF THE PREFERRED EMBODIMENT

Figure 1:
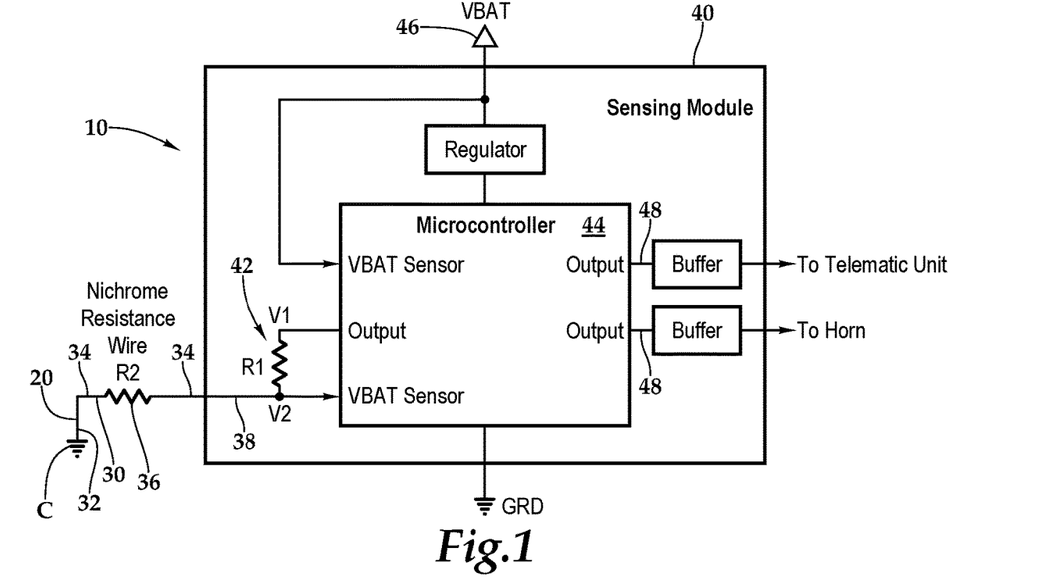
FIG. 1 is a schematic view of a circuit implementing portions of this invention according to one example embodiment, with the schematic both representing microelectronics as well as a sensor electric circuit coupled to a catalytic converter to discourage theft thereof.

Referring to the drawings, wherein like reference numerals represent like parts throughout the various drawing figures, reference numeral 10 is directed to a system for detecting when a catalytic converter C is being tampered with (FIG. 1). The system 10 generates an alarm signal when either the catalytic converter is removed from the vehicle and so no longer grounded, or when the system itself is short circuited (such as might be the case if a thief were to try to disable the system). Even if a theft deterrent of the system 10 is insufficient, and one catalytic converter C is stolen from one vehicle, the alarm increases the probability that other vehicles, such as within a fleet, are protected from such a theft. Also, an opportunity to catch the thief is provided.

Figure 2:
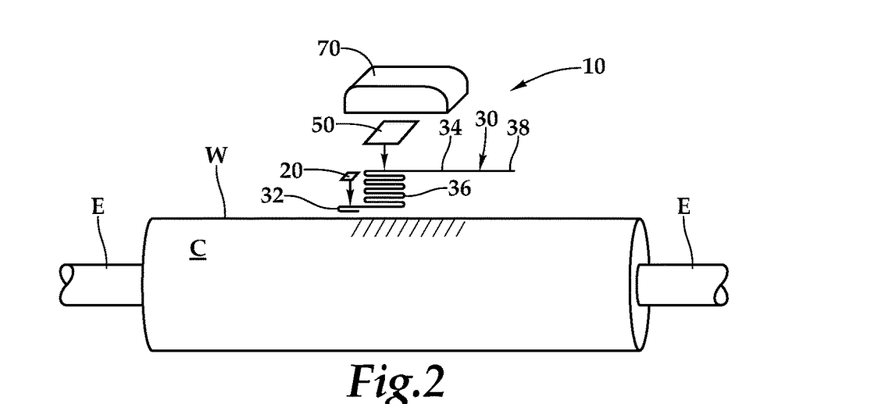
FIG. 2 is a perspective exploded parts view of a catalytic converter with an electric circuit forming a portion of a sensor shown exploded therefrom and illustrating how it is coupled to the catalytic converter as part of the system of this invention according to one example embodiment.
Figure 3:
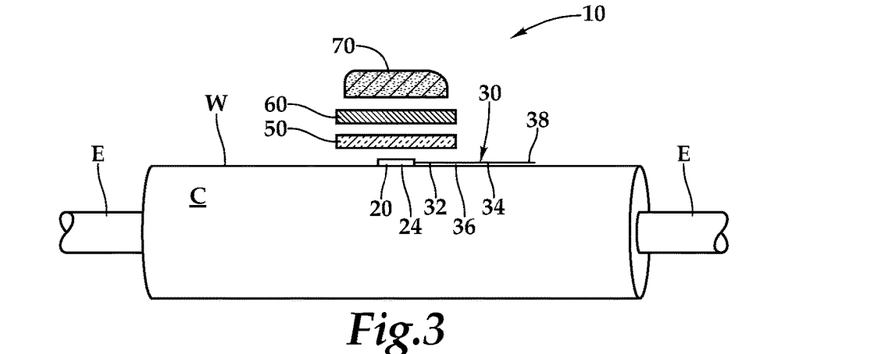
FIG. 3 is a perspective view similar to that which is shown in FIG. 2, but additionally including a hose clamp for holding of the portions of the electric circuit to the catalytic converter and with portions of the system shown exploded away from the catalytic converter and in full section.
Figure 4:
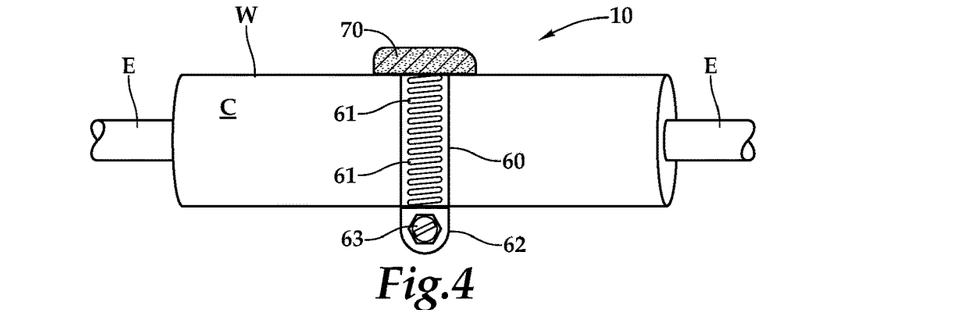
FIG. 4 is a perspective view of that which is shown in FIG. 3, but with the hose clamp and other electric circuit details shown in their attached final configuration upon the catalytic converter.

In essence, and with particular reference to FIGS. 1-3, basic details of the system 10 of this invention are described according to an example embodiment. The system 10 generally includes a conductive pathway with a distal end connected, such as through a conductor 20 (in one example being a washer formed of electrically conductive material), and then extending proximally as a nichrome wire 30 or other high resistance electrically conductive pathway for at least a portion of its extent. A sensing module 40 is coupled to a proximal end of this electrically conductive pathway. The sensing module 40 can be separate from the nichrome wire 30 or include the nichrome wire 30 as a portion thereof. The sensing module 40 is typically adjacent to or incorporated within a microcontroller 44, which can be powered by and integrated into a vehicle of which the catalytic converter C is a part. The microcontroller 44 typically receives power 46, such as from a starter battery of the vehicle, and has outputs 48 which can trigger alarms, such as the honking of the vehicle's horn.

To keep the conductor 20 electrically coupled to the catalytic converter C (and especially an outer wall W thereof) and to resist tampering, elements are provided adjacent to the conductor 20. These elements can include high temperature resistant insulator tape 50 positioned to overlie at least a portion of the conductor 20 and preferably also at least portions of the nichrome wire 30 (which nichrome wire 30 also typically includes a high temperature electrically insulated jacket on an exterior thereof). A hose clamp 60 can overlay the insulator tape 50 and also overlie portions of the nichrome wire 30 and conductor 20. The hose clamp 60 applies a mechanical force holding the conductor 20 firmly against the outer wall W of the catalytic converter C. Moldable high temperature adhesive 70 can be provided over the conductor 20 and also over portions of the hose clamp 60 which also assists in holding the conductor 20 to the catalytic converter C and also protecting the conductor 20 from damage or tampering.

Figure 5:
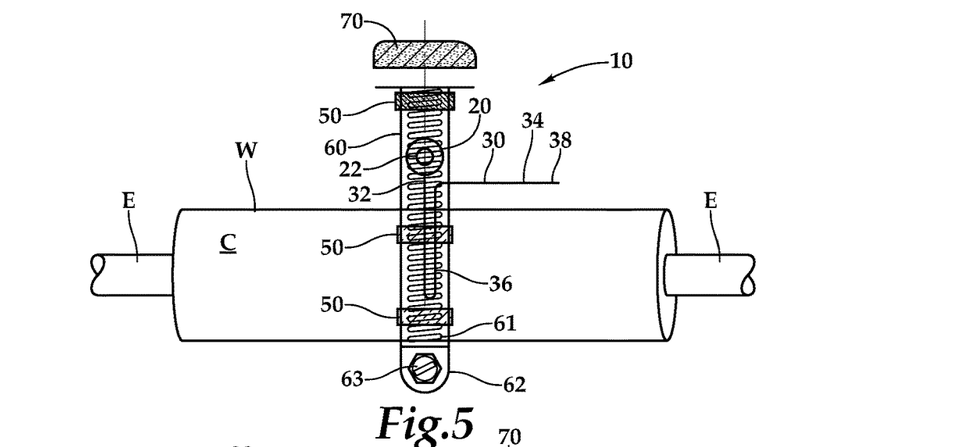
FIG. 5 is a perspective view of an alternative embodiment of that which is shown in FIGS. 2-4, illustrating one potential layout for portions of the electric circuit adjacent to the catalytic converter, and illustrating one methodology for attachment of the electric circuit to the catalytic converter in a manner resisting tampering.
Figure 6:
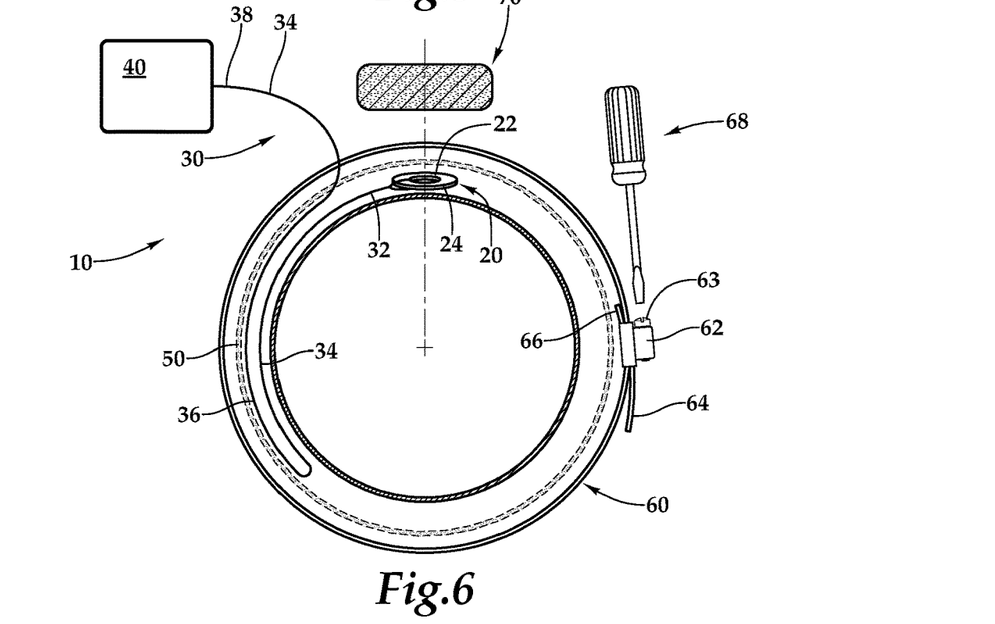
FIG. 6 is an end elevation view of that which is shown in FIG. 5, and in an alternative embodiment where high temperature insulator tape is continuous in form rather than merely provided in smaller discrete strips, as is the case with the embodiment of FIG. 5.

More specifically, and with reference to FIGS. 1, 5 and 6, details of an example embodiment and slight modifications thereof are described. In this example embodiment, each of the elements of this invention are provided together and described in detail for this one embodiment. However, it is recognized that certain elements can be omitted and leave the system still functioning within the scope of at least some other embodiments of this invention.

The system 10 generally includes three major sub-components, including a sensor circuit which is in electrical contact with the catalytic converter C of the vehicle, an interface with the vehicle and/or theft monitoring systems/services separate from the vehicle (for powering the sensor circuit and effectively outputting an alarm signal when catalytic converter C tampering is detected), and a sensor support structure. The sensor support structure helps to hold the sensor circuit in firm and reliable electrical connection to the outer wall W of the catalytic converter C, and also protects against tampering which might occur to attempt to defeat the system of this invention, such as by a thief when stealing the catalytic converter C.

With regard to the sensor circuit, this circuit can be entirely separate from but attached to the microcontroller 44 or can include portions which are exterior to the microcontroller 44 and portions within the microcontroller 44. This sensor circuit can generally be considered to itself include three parts, including the conductor 20, the nichrome wire 30 and the sensing module 40.

The conductor 20 is not strictly required but beneficially helps to ensure a firm and secure electrical connection of an electrically conductive pathway between the outer wall W of the catalytic converter C (or other portion of the catalytic converter C), and the other portions of the sensor circuit and or the vehicle interface. One embodiment without the conductor 20 features, a distal end of the nichrome wire 30 as a bare end 32 (FIGS. 2 and 3) which has an electrical insulation removed therefrom so that this bare end 32 of the nichrome wire 30 can be placed in electrical contact directly against the catalytic converter C (typically through the outer wall W). Remaining portions of the nichrome wire 30 are typically maintained with insulation thereon in the form of a sheathed (i.e. "jacketed") portion 34 of the nichrome wire 30. Even if the conductor 20 is separately provided, the nichrome wire 30 still typically includes the bare end 32 where insulation has been removed therefrom, so that the nichrome wire 30 can have a secure electrical connection to the conductor 20.

In the example embodiment disclosed herein (other than in FIG. 2), the conductor 20 is shown and can be in the form of a washer. This washer includes a central hole and has a planar circular form. The washer is formed from an electrically conductive material such as steel, copper, aluminum, etc. The bare end 32 of the nichrome wire 30 can merely be tied to the conductor 20 (in the form of the washer) or otherwise attached to the conductor 20, such as by soldering, etc. so that electrical connection is provided between the bare end 32 of the nichrome wire 30 and the conductor 20.

The conductor 20 can be attached to the catalytic converter C in a variety of different ways. Options include utilization of a high temperature adhesive, a mechanical fastener, such as the hose clamp 60, adhesive tape, or by soldering/welding or other attachment. This attachment of the conductor 20 to the catalytic converter C (typically to an upper portion of the outer wall W) is configured to accommodate the often very high temperatures present at the catalytic converter C. With such a configuration, the sensor circuit remains securely electrically attached to the catalytic converter C, which is important to avoid "false alarms" which might otherwise be induced by the thermal expansion and contraction encountered by the catalytic converter C or physical loads applied to the conductor 20, such as due to the impacting of the conductor 20 by objects as can often be the case in a location under a vehicle where catalytic converter C is typically located. However, if a thief attempts to remove the conductor 20 from the catalytic converter C, upon achieving success an alarm condition is triggered, as explained in detail below.

Importantly for operation of the sensor circuit, the catalytic converter C is grounded to a frame of the vehicle, typically through the exhaust pipes E and frame of the vehicle, which also acts as a ground for the starter battery of the vehicle or other power source upon a vehicle to which the system 10 of this invention receives power. Thus, when the conductor 20 (or other portions of the electrically conductive pathway of which the conductor 20 is a part) is removed from the catalytic converter C this causes the proximal end of the electrically conductive pathway to be removed from ground and an open circuit condition exists. Also, when the electrically conductive pathway is severed, connection to ground ceases. The sensor circuit is configured such that such an open circuit will trigger an alarm condition.

The final portion of the sensing circuit is the sensing module 40. Sensing module 40 typically includes a voltage divider 42 which is typically external to the microcontroller 44 and circuitry within the microcontroller 44, acting together to sense whether the sensor circuit is detecting catalytic converter C tampering/theft or not, and if such tampering/theft is occurring, to trigger an alarm signal to be passed on to the interface portion of the system 10 of this invention.

The voltage divider 42 provides one form of sensor within the sensor circuit which can conveniently detect two conditions which are each indicative of catalytic converter C tampering, and/or theft. The voltage divider 42 includes the electrically conductive pathway in the form of the conductor 20, nichrome wire 30 and additionally any regular conductive wire which might be provided between a proximal end of the nichrome wire 30 and a sensor port (also called VBAT sensor in a lower left corner of FIG. 1) on the microcontroller 44. Because the conductor 20 and any regular conductor wire has a very low resistance and because the nichrome wire 30 has relatively substantial resistance (such as about 10 ohms per foot) this electrically conductive path from the conductor 20 at the catalytic converter C and the sensor port on the microcontroller 44 can be reliably analogized to being a conductor of a circuit which includes a resistor thereon, it's resistor having a resistance value determined almost entirely by a length of the nichrome wire 30 which is provided along the electrically conductive pathway. In one example embodiment, 6 inches of nichrome wire 30 is provided so that the electrically conductive pathway has a resistance value of 5.0 ohms.

The voltage divider 42 also includes a first resistor which is located between the electrically conductive pathway (typically joined thereto on a portion thereof proximal to the nichrome wire 30) and an output of the microcontroller 44 (labeled "output" in FIG. 1). This output terminal of the microcontroller 44 typically is provided with a voltage which defines a maximum voltage of the voltage divider circuit, for instance 12V. A value of the first resistor is typically any substantially fixed value of resistance, but can be selected to make the overall voltage divider 42 more or less sensitive to small changes in resistance for the electrically conductive pathway between the sensor port on the microcontroller 44 and the catalytic converter C (and ground being 0.0 volts) provided by the catalytic converter C). In one simple example, this first resistor might have a value of 7.0 ohms.

As can be seen in such a simple example, the voltage divider 42 would show a voltage of 5V at the sensor port if the first resistor has a value of 7 ohms, and the electrically conductive pathway and resistance thereof primarily established by the length of nichrome wire 30 has a resistance value of 5 ohms (and the output power voltage is 12V). However, if the electrically conductive pathway is tampered with and caused to be severed from ground, its resistance value would effectively go to infinite. Such an open circuit condition would cause the voltage at the sensor port to read about 12V. On the other hand, if the thief were to try to bypass ("jump") the electrically conductive pathway by providing an electrically conductive jump wire between some accessible portion of the electrically conductive pathway and a ground on the vehicle (such as the frame), this would result in the resistance value of the electrically conductive pathway (including the short circuit along the jump wire) to approach 0 ohms. This would cause the sensor port to read a voltage of approximately 0V.

The microcontroller 44 can monitor voltages sensed by the sensor port of the microcontroller 40. Through experience alarm trigger points can be established. For instance, the system could be configured so that any voltage readings between 1V and 11V would trigger an alarm condition within the microcontroller 44. Other set points could alternatively be provided, such as to make the system 10 more sensitive, or to make the system 10 more resistant to "false alarms."

While the voltage divider 42 and the particular details of the voltage divider 42 described above provide one effective way to configure the system 10 of this invention to function effectively, other forms of voltage dividers 42 could be utilized. Also, other forms of sensors could be provided as alternatives to the voltage divider 42. For instance, wiring could pass to the catalytic converter and back from the catalytic converter to complete a circuit and if the circuit is broken an alarm condition would be triggered. Thus it is not strictly required for all embodiments of this invention that the sensor include the voltage divider 42.

The interface portion of the system 10 of this invention is shown in this example embodiment to be in the form of a microcontroller 44 which includes not only the output port in the sensor port thereon (which work with the voltage divider 42), but also includes power such as through connection via power port to a positive terminal of the starter battery of the vehicle, and also includes multiple output ports 48 separate from the voltage divider 42. While it is convenient to provide electric power from the starter battery along the power 46 line to the microcontroller 44, the microcontroller 44 could include its own internal power supply, such as a battery. In one embodiment, the microcontroller 44 is coupled to the starter battery through the power 46 line but also includes a backup battery. The backup battery can help to avoid drawing current from the starter battery. Also, the backup battery can be effective in triggering an alarm condition even if a thief were to first disconnect the starter battery from the vehicle before stealing the catalytic converter C. Such a backup battery could be within a microcontroller 44 or adjacent to or otherwise coupled to the microcontroller 44, but along a circuit separate from the power 46 line leading to the starter battery.

By appropriately selecting resistances for the voltage divider 42, this voltage divider 42 and the associated microcontroller 44 draw only a small amount of current from the starter battery. However, over time this current draw can still be sufficient to damage the starter battery and potentially leave the vehicle incapacitated. To avoid such degradation, in one form of this invention microcontroller 44 is configured to only energize the voltage divider 42 and sample the sensor port periodically. For instance, microcontroller 44 could be programmed to energize the voltage divider 42 for 10 µs and for the sensor port to provide a reading 8 µs after the voltage divider 42 has been energized. The microcontroller 44 could then power down the voltage divider 42 and sensor port unless an alarm condition is detected. This interval can be repeated only periodically, such as every 10 seconds. In this way, actual powering of the system is only for a small percentage of total time, and correspondingly only a small percentage of power that would otherwise be used is consumed. To enhance reliability, if an alarm condition is sensed, the microcontroller 44 can be programmed to do one or more retests, and only output an alarm condition if a sufficiently large number of alarm conditions are sensed (such as three consecutive voltage readings outside of the acceptable range at the sensor port). Logic operations within the microcontroller 44 can be implemented more with software or more with hardware, depending on preferences of the designer to achieve the function for the circuitry described herein.

The outputs 48 generally carry an alarm signal to one or more different devices to effectively communicate the alarm condition, and either stop the thief from stealing the catalytic converter C or assist in capturing a thief or at least scaring off the thief before other catalytic converters C on the vehicle or other vehicles within a fleet of vehicles can be similarly pillaged.

In one embodiment, at least one of the outputs 48 is coupled to a horn of the vehicle. When an alarm condition is detected, the horn is caused to sound. In another embodiment, at least one of the outputs 48 is coupled to a vehicle alarm (audible or silent), and the vehicle alarm is triggered according to the design of the vehicle alarm system. Some vehicle alarm systems trigger the recording of video from cameras associated with the vehicle, with or without an audible horn or other alarm sounds. Some such alarm systems communicate wirelessly, such as through a wireless data connection between the vehicle and the Internet (or some other local area network (LAN) or wide area network (WAN)). Still other alarm systems can be directly coupled to a police department or other security service for appropriate notification.

Outputs 48 could alternatively be coupled to some other wireless transmission system which could communicate wirelessly to appropriate personnel that the catalytic converter C is being tampered with or stolen. Microcontroller 44 can be configured to have separate inputs and outputs for multiple catalytic converters C, as many vehicles include two catalytic converters C, for instance.

The microcontroller 44 and other portions of the interface, such as depicted in FIG. 1, can be coupled to a control area network (CAN) bus of the vehicle to provide for convenient interconnection and to simplify the installation process for the system of this invention. Such interconnection into the CAN bus could be through the OBD-II diagnostic connector or otherwise wired into the CAN bus of the vehicle. Alternatively, the system of this invention could merely tap into the battery and potentially also the horn of the vehicle and otherwise remain separate from other electronics on the vehicle. Preferably the system 10 does not operate when the vehicle is running (to avoid triggering any horn honk false alarm during vehicle use). As one option, the voltage of the battery is monitored. When the voltage is above about 13V (or other selected threshold) for the starter battery, indicative of alternator operation due to the vehicle running, the system 10 is shut off.

With particular reference to FIGS. 5 and 6, details of the third major subcomponent of the system 10 of this invention in the form of the sensor support are described, according to this one example embodiment. Generally, the purposes of this sensor support are to securely hold the distal portions of the sensor circuit securely and reliably electrically to the catalytic converter C, whilst also concealing at least portions of the sensor circuit to make tampering therewith more difficult and to protect the sensor circuit from such tampering. The sensor support includes high temperature insulator tape 50, a hose clamp 60 and moldable high temperature adhesive 70. In various embodiments, it is conceivable that one or more of these elements of the sensor support could be omitted, and the system 10 of this invention could still function effectively in such embodiments.

High temperature insulator tape 50 can be provided in a continuous form (FIG. 6) or in discreet separate elements/strips (FIG. 5). High temperature insulator tape 50 helps to hold the conductor 20 and nichrome wire 30 where initially positioned, against the outer wall W of the catalytic converter C. It is desirable that the conductor 20 and nichrome wire 30 maintain fixed position. Ideally, the conductor 20 is on an upper surface of the outer wall W of the catalytic converter C, so that road debris impacting the area where the catalytic converter C is located is less likely to impact the conductor 20 and dislodge it (potentially triggering a false alarm). Insulator tape 50 is of a high temperature nature so that it can withstand the high temperatures encountered when the catalytic converter C is in operation.

The nichrome wire 30 includes a sheathed portion 34 and a bare end 32. The bare end 32 and conductor 20 are in electrical connection with the outer wall W of the catalytic converter C. However, the sheath portion 34 of the nichrome wire 30 is insulated by its insulation jacket, from electrical connection to the catalytic converter C. Thus, the insulator tape 50 holding the nichrome wire 30 down against the outer wall W of the catalytic converter C does not affect resistance measured by the voltage divider 42 or other sensor of the sensing module 40 or other portions of the system 10 of this invention. The high temperature insulator tape 50 merely helps to hold a conductor 20 and/or nichrome wire 30 in place adjacent to the outer wall W of the catalytic converter C, but also can protect the conductor 20 and/or nichrome wire 30 from damage by the tight hose clamp 60.

A length of nichrome wire 30 is selected to be long enough so that an appreciable resistance is provided for the voltage divider 42 so that it has appropriate sensitivity (not too sensitive and not too unsensitive). Preferably a majority of this length of nichrome wire 30 is concealed under the high temperature insulator tape 50, so that it cannot be seen by a potential thief. The thief is then unable to utilize nichrome wire as a jumper wire and merely provide a length of nichrome wire similar in length to the length of nichrome wire 30 within the system 10 of this invention, because this length of the nichrome wire 30 cannot be easily seen. The sheathed wire 34 portion of the nichrome wire 30 is preferably covered with an insulated jacket, such as a fiberglass insulation jacket, which can also withstand the high temperatures of the outer wall W of the catalytic converter C.

In addition to (or potentially as an alternative to) the insulator tape 50, the hose clamp 60 is provided. This hose clamp 60 can completely gird the catalytic converter C (see FIGS. 5 and 6). The hose clamp 60 including bracket 62 where an outer end 64 and inner end 66 of hose clamp 60 come together. Slots 61 in the hose clamp 60 interact with a screw worm drive element (typically turned by a screwdriver 68) to cause tightening of the hose clamp 60 down onto the outer wall W of the catalytic converter C. The hose clamp 60, once tightened, securely holds the conductor 20 to the outer wall W of the catalytic converter C.

The hose clamp 60 also covers the nichrome wire 30 (at least most portions thereof). At least a small portion of nichrome wire 30 on a proximal portion thereof is allowed to pass laterally out of the hose clamp 60 and pass to the sensing module 40, typically through a length of low resistance electric wire 38 at the proximal end and through the voltage divider 42 circuitry, as disclosed in detail above. The hose clamp 60 conceals the conductor 20 and nichrome wire 30 so that it is difficult to see. Beneficially, because the catalytic converter C undergoes significant thermal expansion and contraction during use, the hose clamp 60 can be designed of similar materials to the outer wall W of the catalytic converter C, so that the hose clamp 60 will expand and contract thermally together with the outer wall W of the catalytic converter C, and maintain a secure attachment for the conductor 20 and nichrome wire 30, without differential thermal expansion and contraction causing wear over the passage of time.

In addition to or separate from the hose clamp 60 and/or insulator 50, the moldable high temperature adhesive 70 is preferably provided overlying the conductor 20 and bare end 32 of the nichrome wire 30. This moldable high temperature adhesive can be provided in liquid form, and harden to encapsulate bare conductor surfaces, and further help to ensure that electrical performance of the system 10 of this invention remains reliably within desired parameters to either accurately not detect an alarm condition or accurately detect an alarm condition, depending on whether tampering/theft is happening or not.

In use and operation, and with continuing reference to FIGS. 1, 5 and 6, the system 10 of this invention is first installed as shown herein and described above. Under normal circumstances, and when no tampering or theft of the catalytic converter C is occurring, the microcontroller 44 is powered so that the voltage divider 42 senses a standard amount of resistance along the electrically conductive pathway. Because no out of bounds voltage readings are detected at the sensor port of the microcontroller 44, no alarm signal is sent or other alarm condition established.

If a thief attempts to steal the catalytic converter C in usual fashion, this first involves cutting exhaust pipe E upstream and downstream of the catalytic converter C. Because the exhaust system including exhaust pipes E and typically grounded to the vehicle, the thief will typically successfully cut through one of the exhaust pipes E at the catalytic converter C is still grounded. Furthermore, the electrically conductive circuit remains in contact with the catalytic converter C through the conductor 20, so no alarm condition is detected. When the thief cuts the second exhaust line E and separates the catalytic converter C from the vehicle, the catalytic converter C is no longer "grounded." This causes a voltage sensed that the sensor port of the microcontroller 44 to change to an out of bounds condition. An alarm signal is thus generated. The alarm signal can result in sounding the horn (or other output 48), scaring off the thief or assisting in capturing the thief. Furthermore, other vehicles within a fleet are protected from damage by scaring the thief off after only attacking one catalytic converter C of one vehicle. If the thief is able to keep the catalytic converter C grounded in some fashion, even after cutting both of the exhaust pipes E, the thief will still eventually need to sever the electrically conductive pathway so that the catalytic converter C can be taken away. When this electrically conductive pathway is severed, the sensor port of the microcontroller 44 will sense an out of bounds voltage reading and an alarm signal will be generated.

If the thief attempts, before severing the electrically conductive pathway, to add a jumper wire between the electrically conductive pathway and ground on the vehicle, this will still alter the resistance of the electrically conductive pathway. This altering of the resistance of the electrical conductive pathway will cause the voltage at the sensor port of the microcontroller 44 to provide an out of bounds reading and generate an alarm signal. Only if the thief could determine the amount of resistance in the electrically conductive pathway and ground the electrical conductive pathway to the frame of the vehicle along a jumper line with a closely matching resistance, could the system 10 be avoided with such a jumper wire. If needed, different systems 10 could be provided with unique resistance values associated with different lengths of nichrome wire 30 and the system 10 would be initially calibrated for the length of nichrome wire 30 provided. In this way, a thief with information on how the system 10 operates generally, would still have a low probability of selecting an appropriate resistance for a jumper wire to avoid an alarm signal being generated.

Typically it is difficult to remove a starter battery from a vehicle. However, if the thief were to attempt to disconnect the starter battery before stealing the catalytic converter C, for at least embodiments of this system 10 which include a backup battery, the system 10 would still operate adequately to output an alarm signal.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for warning when catalytic converter theft is occurring, comprising in combination:
    a voltage divider coupled to an output and a sensor port of a microcontroller and with a first resistor having a first resistance between the output and the sensor port;
    the voltage divider coupled to the catalytic converter via a conductive pathway having a second resistance, which conductive pathway is also coupled to the sensor port of the microcontroller;
    the microcontroller having a source of power and an alarm signal output which outputs an alarm signal when the sensor port indicates that the voltage divider senses a change in resistance of the conductive pathway, indicative of catalytic converter disturbance;
    wherein the conductive pathway includes a nichrome wire;
    wherein the nichrome wire is encapsulated within insulation over a majority of its length;
    the nichrome wire insulation being stable at high temperatures of catalytic converter operation;
    the nichrome wire being free of any insulation jacket at a distal end of the nichrome wire closest to the catalytic converter; and
    wherein the proximal end of the nichrome wire is electrically coupled to an outer housing of the catalytic converter, which housing is also coupled at least indirectly to ground.

2. The system of claim 1 wherein the alarm signal is coupled to a horn of a vehicle within which the catalytic converter is located, such that when the alarm signal is sent from the microcontroller the horn of the vehicle sounds.

3. The system of claim 1 wherein voltage is intermittently applied to the voltage divider, less than full time to minimize power drain; and
    the microcontroller senses the resistance in the conductive pathway only while the voltage divider is powered.

4. A system for warning when catalytic converter theft is occurring, comprising in combination:
    a voltage divider coupled to an output and a sensor port of a microcontroller and with a first resistor having a first resistance between the output and the sensor port;
    the voltage divider coupled to the catalytic converter via a conductive pathway having a second resistance, which conductive pathway is also coupled to the sensor port of the microcontroller;
    the microcontroller having a source of power and an alarm signal output which outputs an alarm signal when the sensor port indicates that the voltage divider senses a change in resistance of the conductive pathway, indicative of catalytic converter disturbance;
    wherein a washer of electrically conductive metal connects the conductive pathway to the catalytic converter;
    wherein a high temperature insulator is placed over the washer; and
    wherein a hose clamp girds the catalytic converter and at least partially covers the washer.

5. The system of claim 4 wherein the conductive pathway includes a length of nichrome wire located beneath the hose clamp, and with the nichrome wire having an insulation jacket of high temperature insulation over a majority of its length.

6. The system of claim 5 wherein the nichrome wire has two parallel lengths beneath the hose clamp and joined at a 180° bend under the hose clamp.

7. The system of claim 5 wherein the washer is encapsulated under a moldable high temperature adhesive.

8. A system for protecting a catalytic converter in a vehicle from tampering, the system comprising in combination:
    a conductive pathway extending between the catalytic converter which is grounded and a sensor;
    said sensor configured to sense changes in resistance of said conductive pathway correlating with a high probability that the catalytic converter is being tampered with;
    an alarm coupled to said sensor, said alarm activated once said sensor detects a change in resistance of said conductive pathway;
    wherein said conductive pathway includes a length of nichrome wire;
    wherein a distal end of said nichrome wire is electrically coupled to an outer housing of the catalytic converter;
    wherein said distal end of said nichrome wire is encapsulated within a high temperature bonding agent, said bonding agent bonded to the outer housing of the catalytic converter.

9. The system of claim 8 wherein said sensor includes a voltage divider with a first resistance and a second resistance, said second resistance including said resistance of said conductive pathway.

10. The system of claim 8 wherein said sensor activates a horn of the vehicle.

11. The system of claim 8 wherein said sensor is powered intermittently by power from a starter battery of the vehicle, such that current draw from the battery is reduced relative to the sensor being powered continuously.

12. The system of claim 8 wherein a proximal end of said conductive pathway is coupled to a voltage divider, said voltage divider forming at least a portion of said sensor, said voltage divider including a first resistance and a second resistance, said second resistance including said resistance of said conductive pathway.

13. The system of claim 12 wherein a microcontroller is coupled to said voltage divider with said microcontroller including a power output having a first voltage of said voltage divider and a sensor port on said microcontroller sensing a second voltage less than said first voltage, a difference between said first voltage and said second voltage indicative of a difference between said first resistance and said second resistance, said microcontroller receiving electric power from a starter battery of the vehicle, said microcontroller coupled to a horn of the vehicle, said microcontroller configured to cause the horn of the vehicle to be sounded when the sensor port of the microcontroller senses a voltage indicative of catalytic converter tampering.

14. A system for protecting a catalytic converter in a vehicle from tampering, the system comprising in combination:
- a conductive pathway extending between the catalytic converter which is grounded and a sensor;
- said sensor configured to sense changes in resistance of said conductive pathway correlating with a high probability that the catalytic converter is being tampered with;
- an alarm coupled to said sensor, said alarm activated once said sensor detects a change in resistance of said conductive pathway;
- wherein said conductive pathway includes a length of nichrome wire;
- wherein a distal end of said nichrome wire is electrically coupled to an outer housing of the catalytic converter;
- wherein high temperature insulator tape overlies at least portions of said nichrome wire holding said nichrome wire to said outer housing of said catalytic converter, and with a hose clamp on a side of said insulator tape opposite said nichrome wire, said hose clamp tightened down onto said insulation tape and said nichrome wire with said pipe clamp girding an entire circumference of the catalytic converter.

15. A system for protecting a catalytic converter in a vehicle from tampering, the system comprising in combination:
- a conductive pathway extending between the catalytic converter which is grounded and a sensor;
- said sensor configured to sense changes in resistance of said conductive pathway correlating with a high probability that the catalytic converter is being tampered with;
- an alarm coupled to said sensor, said alarm activated once said sensor detects a change in resistance of said conductive pathway;
- wherein said conductive pathway includes a length of nichrome wire;
- wherein a distal end of said nichrome wire is electrically coupled to an outer housing of the catalytic converter;
- wherein said distal end of said nichrome wire is free of an insulation jacket, while other portions of said nichrome wire have an insulation jacket thereon, and with said distal end of said nichrome wire coupled to an electrically conductive washer which in turn is electrically coupled to the outer housing of the catalytic converter.

\* \* \* \* \*